United States Patent [19]
Falwell et al.

[11] Patent Number: 4,724,561
[45] Date of Patent: Feb. 16, 1988

[54] WATERBED FOOTRAIL CAP

[76] Inventors: Bobby R. Falwell, Rte. 7, Box 696, Murray, Ky. 42071; Orval H. Wooley, 7301 Annie La., Paducah, Ky. 42001

[21] Appl. No.: 44,607

[22] Filed: May 1, 1987

[51] Int. Cl.⁴ .................. A47C 21/00; A47C 31/00
[52] U.S. Cl. ............................................. 5/508; 5/424; 248/345.1; 403/232.1; 403/403
[58] Field of Search .............. 5/451, 400, 424, 282 R, 5/508; 248/345.1; 403/403, 232.1

[56] References Cited
U.S. PATENT DOCUMENTS 3,098,243  7/1963  Roche .................................. 5/282 R
4,109,887  8/1978  Wakeland ............................ 5/451

Primary Examiner—Alexander Grosz
Attorney, Agent, or Firm—Mark J. Patterson

[57] ABSTRACT

A padded cap for the footrail of a waterbed frame comprises a cushioned member, a support member, and a mounting bracket adapted for transmitting loads to both the cap and rail.

2 Claims, 6 Drawing Figures

WATERBED FOOTRAIL CAP

BACKGROUND OF THE INVENTION

The present invention relates to a padded cap for use on the footrail of a waterbed frame.

Although waterbeds have become increasingly popular and sophisticated in their design, most still use a conventionally designed wooden frame to contain the water filled mattress. Campian, U.S. Pat. No. 4,625,351, describes on example of such a frame. A well-recognized problem with the typical waterbed frame is that the wooden rails are uncomfortable for the user while sitting or while entering or exiting the bed. Consequently, a variety of slip-on padded rail caps have been developed to address these problems. Examples are described by Fisher, U.S. Pat. No. 4,514,871; James, U.S. Pat. No. 4,554,039; Wakeland U.S. Pat. No. 4,109,887; and Johenning, U.S. Pat. No. 4,197,602.

However, conventional footrail caps, commonly referred to in the industry as a "perch", have been unreliable in their overall construction and method of attachment to the footrail. Such caps are typically one- or two-piece units attached by a simple L-shaped bracket made of angle iron. In such a configuration, a significant portion of the load is transmitted directly and exclusively to the screws which secure the L-shaped bracket to the cap and rail, rather than being distributed throughout the cap and rail. What is needed, then, is a footrail cap which has mounting means adapted for distributing loads throughout the cap and rail to increase the strength and durability of the cap as a whole.

SUMMARY OF THE INVENTION

In the present invention, a planar cushioned member formed of foam-like material is bonded to a planar support member of particle board or similar rigid material. Mounting brackets with L-shaped and U-shaped ends are provided, with the U-shaped end fitting over the support member and between the support and cushion members. The L-shaped section of the bracket abuts the top and side surfaces of the footrail, being screw attached to the inside rail surface.

DESCRIPTION OF THE PREFERRED EMBODIMENT

Figure 1:
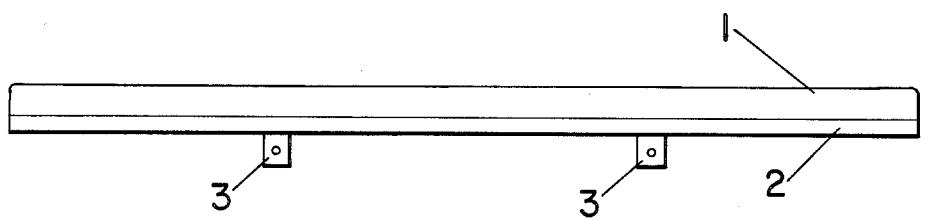
FIG. 1 is a lengthwise side view of the footrail cap.
Figure 2:
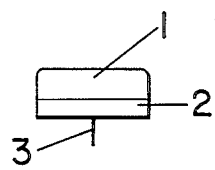
FIG. 2 is an end view of the footrail cap.
Figure 3:
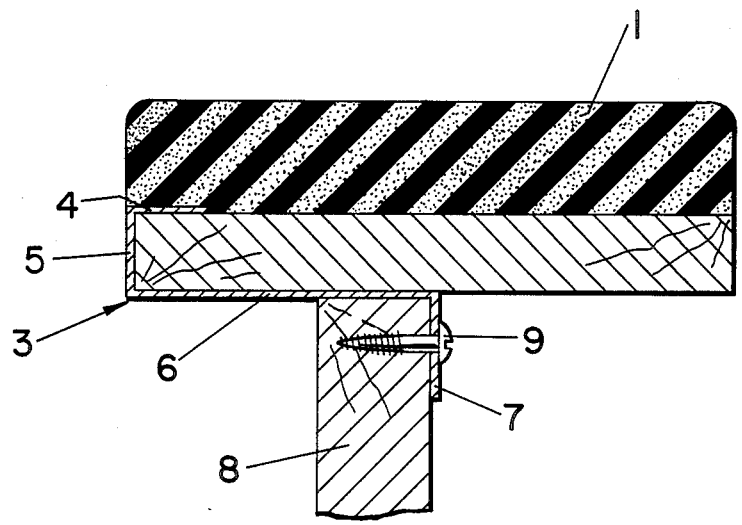
FIG. 3 is an enlarged cross-sectional view of the footrail cap mounted to a footrail.
Figure 4:
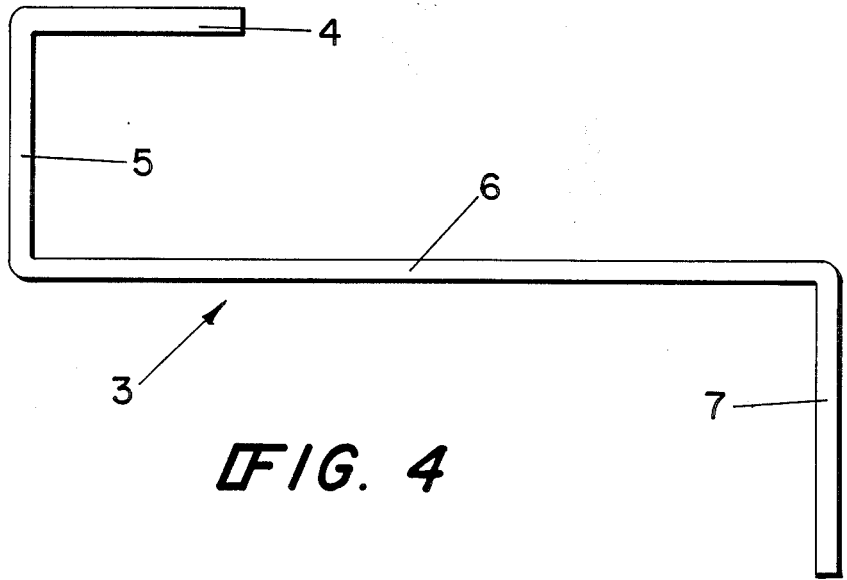
FIG. 4 is an enlarged view of the mounting bracket.
Figure 5:
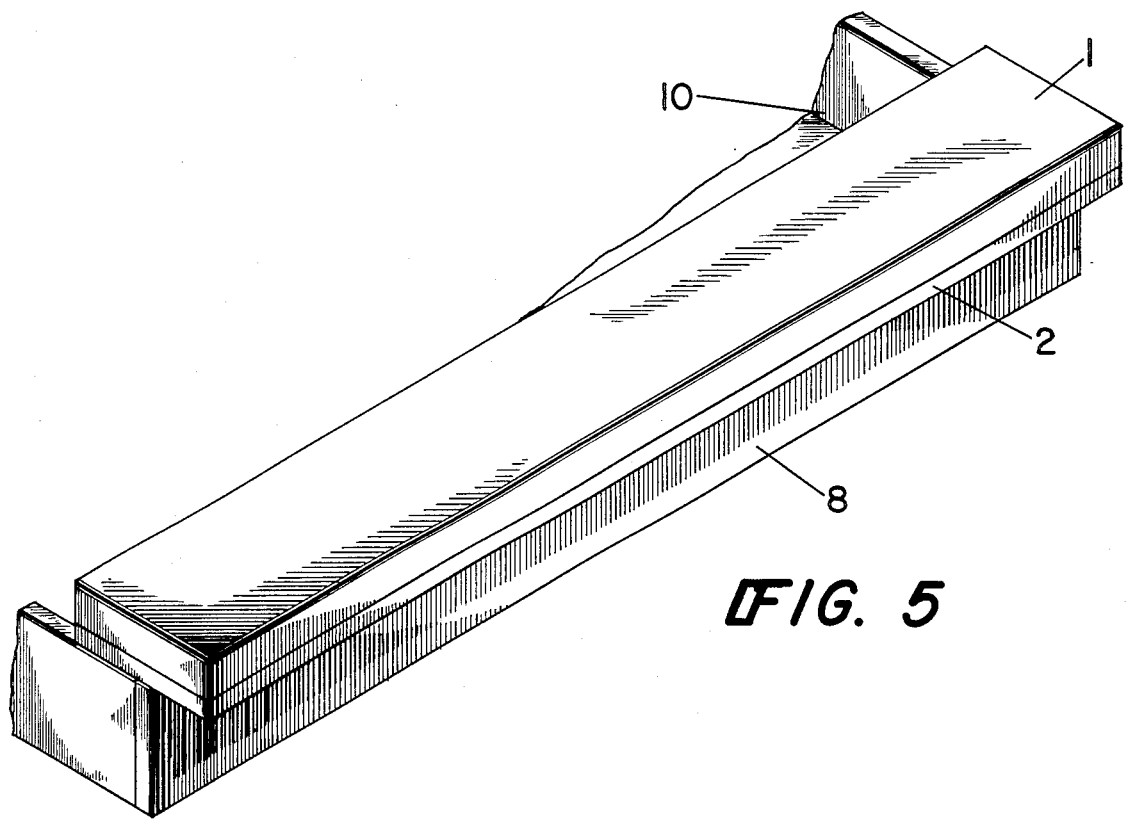
FIG. 5 is a perspective view of the footrail cap mounted to a waterbed frame.
Figure 6:
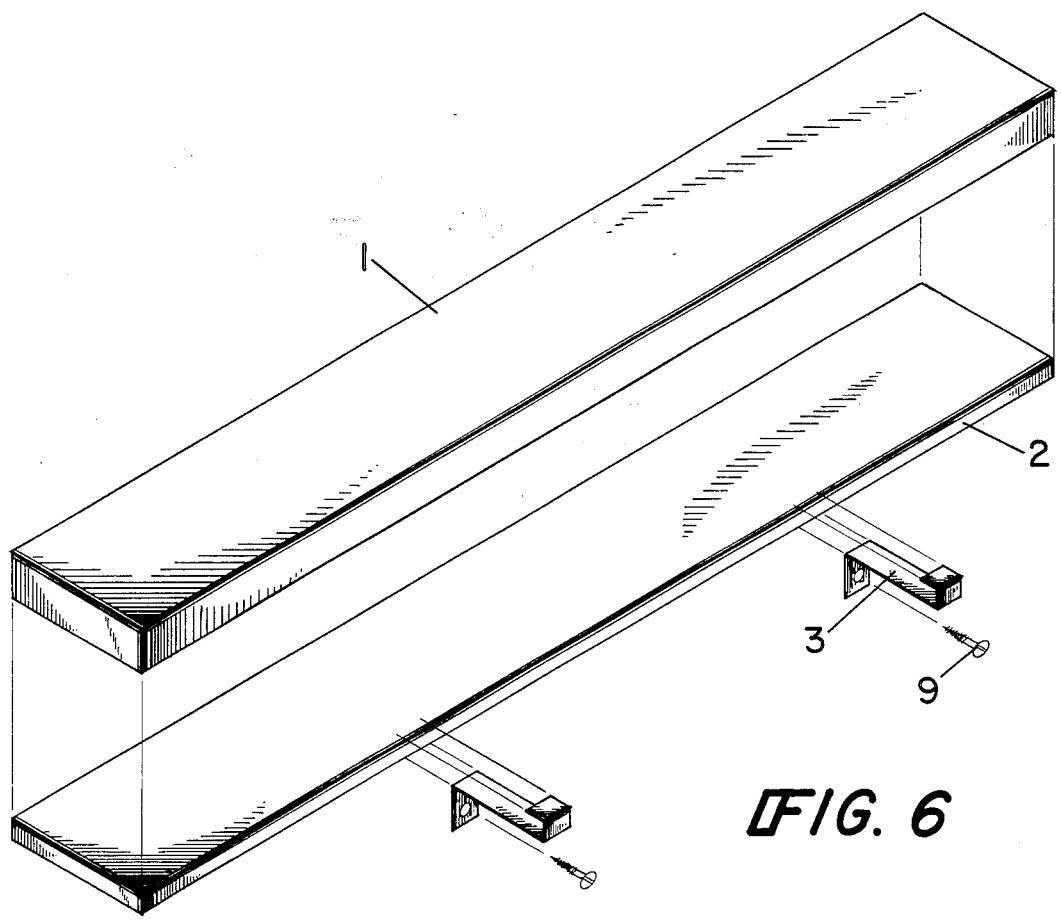
FIG. 6 is an exploded view of the footrail cap.

As best seen on FIGS. 3, 5, and 6, a waterbed footrail cap comprises cushion member 1, glued or otherwise bonded to support member 2, made of wood or wood products, and mounting bracket 3, mounted on footrail 8 of waterbed frame 10. Mounting bracket 3, comprising a U-shaped portion defined by sections 4, 5, and 6, and an L-shaped portion defined by sections 6 and 7, is fitted as shown, with section 4 placed between members 1 and 2. L-shaped section 7 is adapted for attachment by screw 9 to the inside vertical surface of footrail 8. Mounted as shown, the footrail cap effectively transmits the load of a person sitting on the cap throughout the cap and rail, rather than through merely the screws securing the typical L-shaped bracket.

What we claim is:

1. An improved cap for cushioning the footrail of a waterbed, having a cushioned member bonded to a support member, said improvement comprising a mounting bracket abutting said support member and abutting the top and inside surfaces of said footrail, with a portion of said bracket located between said cushion and support member.

2. The improved cap of claim 1 where said mounting bracket comprises:
   a. an L-shaped portion abutting the top and inside surfaces of said footrail; and
   b. a U-shaped portion partially abutting the lower and outside surfaces of said support member, with the distal section of said U-shaped portion located between said cushion and support members.

* * * * *